(No Model.) 2 Sheets—Sheet 1.

W. F. MANGELS.
BICYCLE RAILWAY.

No. 567,486. Patented Sept. 8, 1896.

WITNESSES:
John A. Rennie

INVENTOR
W. F. Mangels

BY

ATTORNEYS.

THE NORRIS PETERS CO., PHOTO-LITHO., WASHINGTON, D. C.

(No Model.) 2 Sheets—Sheet. 2.

W. F. MANGELS.
BICYCLE RAILWAY.

No. 567,486. Patented Sept. 8, 1896.

WITNESSES:
John A. Rennie
Theo. G. Hoster

INVENTOR
W. F. Mangels
BY
ATTORNEYS

UNITED STATES PATENT OFFICE.

WILLIAM F. MANGELS, OF BROOKLYN, NEW YORK.

BICYCLE-RAILWAY.

SPECIFICATION forming part of Letters Patent No. 567,486, dated September 8, 1896.

Application filed March 31, 1896. Serial No. 585,589. (No model.)

*To all whom it may concern:*

Be it known that I, WILLIAM F. MANGELS, of Brooklyn, (Coney Island,) in the county of Kings and State of New York, have invented a new and Improved Bicycle-Railway, of which the following is a full, clear, and exact description.

The object of the invention is to provide a new and improved bicycle-railway, arranged to permit unskilled persons to safely enjoy bicycle riding.

The invention consists of certain parts and details and combinations of the same, as will be fully described hereinafter, and defined in the claims.

Reference is to be had to the accompanying drawings, forming a part of this specification, in which similar characters of reference indicate corresponding parts in all the figures.

Figure 1:
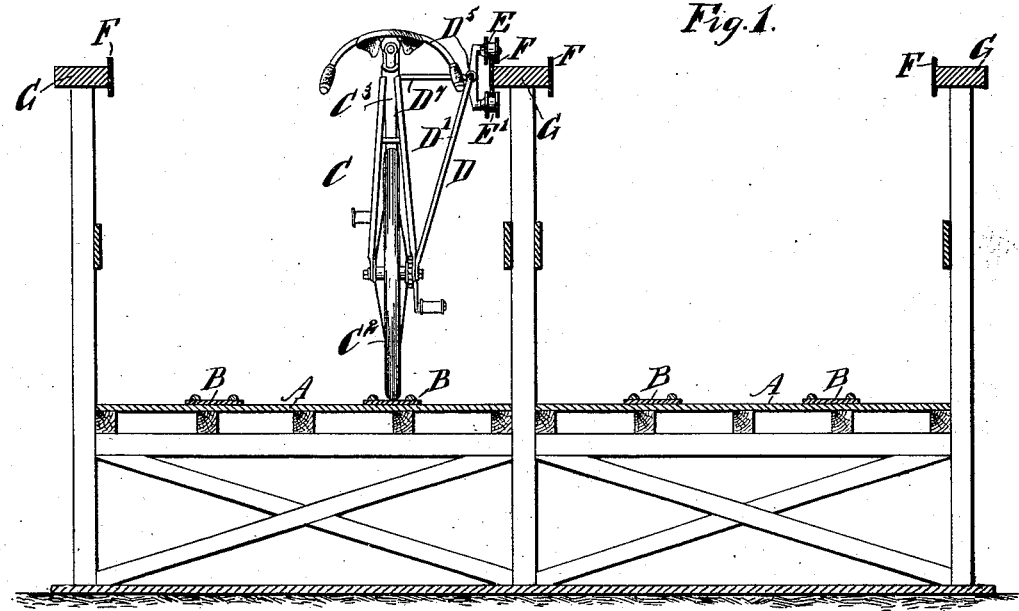
Figure 2:
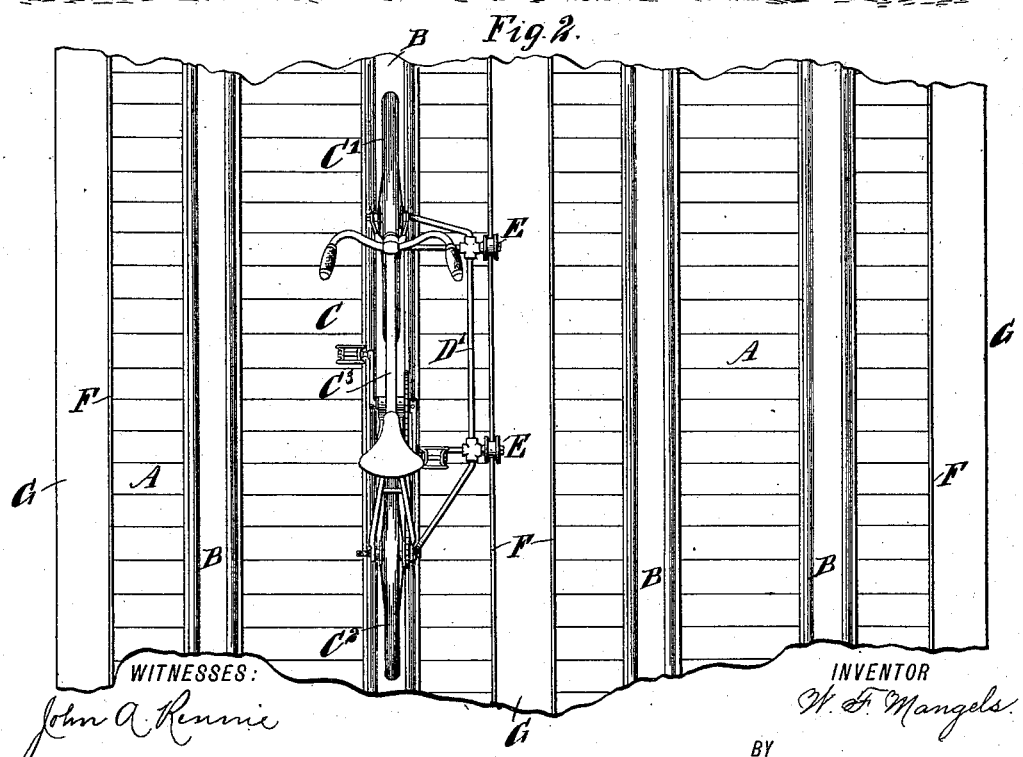
Figure 3:
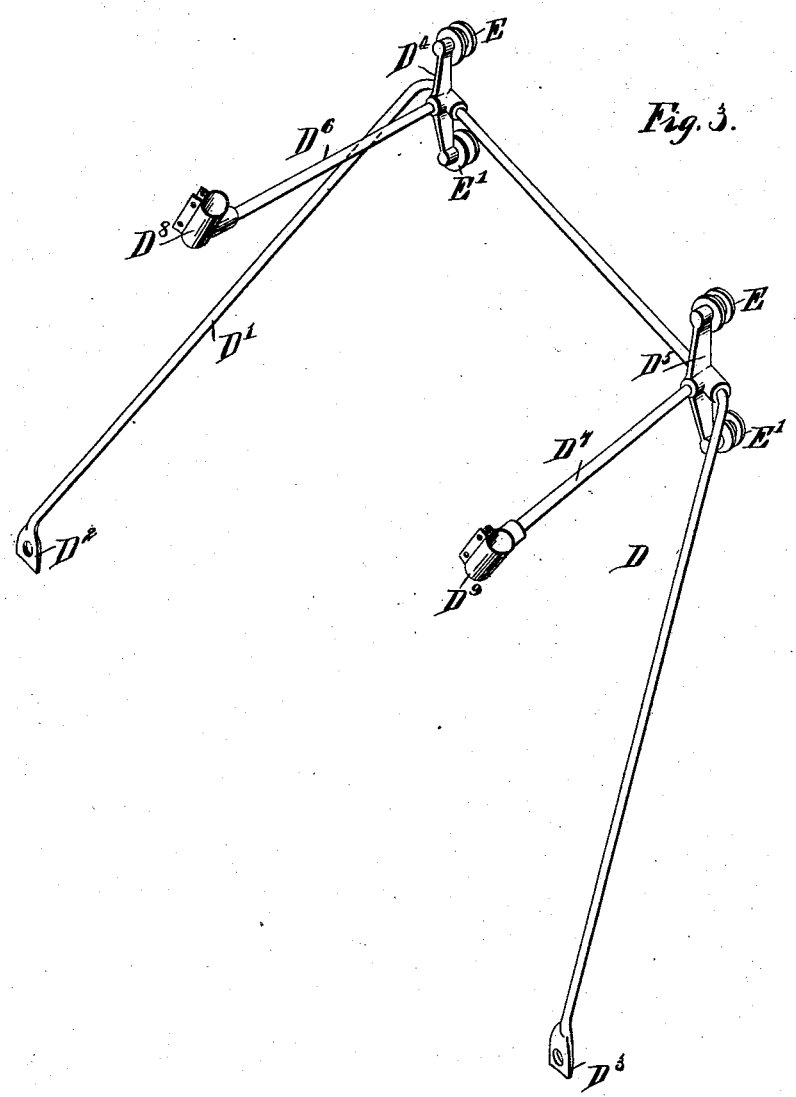

Figure 1 is a cross-section of the improvement. Fig. 2 is a plan view of the same, and Fig. 3 is an enlarged perspective view of the auxiliary frame.

The improved bicycle-railway is provided with a suitable floor A, preferably arranged under a roof within a suitable building, the floor being provided with one, two, or more tracks B, preferably made continuous in circular, rectangular, or other form, and each track being arranged for the wheels C' C² of an ordinary bicycle C to run on.

On the frame C³ of the bicycle is secured a laterally-projecting auxiliary frame D, supporting sets of wheels E E', mounted to run on the top and bottom edges of a continuous rail F, secured to a sleeper G, supported above the floor A and at one side of the track B, as is plainly indicated in Fig. 1. The auxiliary frame D is preferably of the construction shown in detail in Fig. 3, the frame being provided with a U-shaped arm D', formed at its ends with eyes D² D³, adapted to engage the axles of the front and rear wheels C' C², respectively, with the nuts of the axles engaging the outer faces of the eyes D² D³, to securely fasten the same in place. The arm D' extends upwardly and outwardly from the side of the bicycle, as plainly indicated in Figs. 1 and 2, and on the middle portion of said arm are secured vertically-disposed hangers D⁴ D⁵, carrying studs for the wheels E E', engaging the top and bottom of the rail F, as previously mentioned. From the hangers D⁴ D⁵ extend laterally the rods D⁶ D⁷, respectively, provided at their free ends with clamps D⁸ D⁹, adapted to be fastened to the steering-head of the center brace, respectively, of the bicycle-frame C³. Now it will be seen that by the arrangement described the grooved wheels E E' in engaging the top and bottom of the edges of the rail F hold the bicycle C in a vertical position, and consequently an unskilled person riding the bicycle C can readily propel the latter on the track B without any danger whatever of falling off the bicycle or upsetting the latter.

It will be seen that by the arrangement described unskilled persons can safely mount the bicycle C and ride around the track B without incurring any danger whatever, and at the same time fully enjoy the bicycle ride.

Having thus fully described my invention, I claim as new and desire to secure by Letters Patent—

1. An auxiliary frame for bicycles, the auxiliary frame comprising a U-shaped arm adapted to be fastened to the axles of a bicycle, hangers held on the middle portion of said arm and carrying grooved wheels, and rods extending laterally from said hangers and provided with clamps for engagement with parts of the bicycle-frame, substantially as shown and described.

2. An auxiliary frame for bicycles, the frame having a U-shaped arm capable of being fastened to the bicycle, a hanger held by the arm, two grooved wheels carried by the hanger, and a rod extending laterally from the hanger and capable of being connected with the bicycle, substantially as described.

WILLIAM F. MANGELS.

Witnesses:
JOHN A. HARRISON,
JOHN L. McCULLOUGH.